(12) United States Patent
Coda et al.

(10) Patent No.: US 7,727,308 B2
(45) Date of Patent: Jun. 1, 2010

(54) NON-EVAPORABLE GETTER ALLOYS FOR HYDROGEN SORPTION

(75) Inventors: Alberto Coda, Gerenzano (IT); Alessandro Gallitognotta, Origgio (IT); Debora Caccia, Canegrate (IT); Paola Baronio, Caronno Pertusella (IT); Luca Toia, Carnago (IT); Mario Porro, Caronno Pertusella (IT)

(73) Assignee: Saes Getters S.p.A., Lainate MI (IT)

( * ) Notice: Subject to any disclaimer, the term of this patent is extended or adjusted under 35 U.S.C. 154(b) by 246 days.

(21) Appl. No.: 11/791,384

(22) PCT Filed: Nov. 18, 2005

(86) PCT No.: PCT/IT2005/000673

§ 371 (c)(1),
(2), (4) Date: May 23, 2007

(87) PCT Pub. No.: WO2006/057020

PCT Pub. Date: Jun. 1, 2006

(65) Prior Publication Data

US 2008/0028931 A1 Feb. 7, 2008

(30) Foreign Application Priority Data

Nov. 23, 2004 (IT) .......................... MI2003A2271

(51) Int. Cl.
*B01D 53/02* (2006.01)
(52) U.S. Cl. .............................. 95/116; 96/108; 75/228; 75/235; 420/30; 420/422; 252/181.1
(58) Field of Classification Search .................. 96/108; 95/116; 75/228, 235; 420/30, 422; 252/181.1, 252/181.4, 181.6, 181.7
See application file for complete search history.

(56) References Cited

U.S. PATENT DOCUMENTS

| | | | |
|---|---|---|---|
| 3,203,901 | A | 8/1965 | Della Porta |
| 3,953,755 | A | 4/1976 | Kuus et al. |
| 4,071,335 | A | 1/1978 | Barosi |
| 4,306,887 | A | 12/1981 | Barosi et al. |
| 4,312,669 | A | 1/1982 | Boffito et al. |
| 4,668,424 | A | 5/1987 | Sandrock |

(Continued)

FOREIGN PATENT DOCUMENTS

EP 0869195 A 10/1998

(Continued)

OTHER PUBLICATIONS

Elliott,ed.; Constitution of Binary Alloys, First Supplement; 1965; 63-64, 174-175, 276-277, 342-343, 388-389, 442-443, 529-530, 601-602, 619-620, 636-637, 677-679, 837, 853-854, 860-865, 870; McGraw-Hill (1965).

(Continued)

*Primary Examiner*—Robert J Hill, Jr.
*Assistant Examiner*—Christopher P Jones
(74) *Attorney, Agent, or Firm*—Panitch Schwarze Belisario & Nadel LLP

(57) ABSTRACT

Non-evaporable getter alloys are provided which can be activated at relatively low temperatures and are capable of efficiently sorbing hydrogen.

12 Claims, 7 Drawing Sheets

U.S. PATENT DOCUMENTS

| | | | |
|---|---|---|---|
| 4,839,085 A | 6/1989 | Sandrock et al. | |
| 5,180,568 A | 1/1993 | Boffito et al. | |
| 5,921,461 A | 7/1999 | Kennedy et al. | |
| 5,961,750 A | 10/1999 | Boffito et al. | |
| 5,976,723 A | 11/1999 | Boffito et al. | |
| 6,514,430 B1 * | 2/2003 | Corazza et al. | 252/181.1 |
| 6,521,014 B2 * | 2/2003 | Toia et al. | 75/245 |

FOREIGN PATENT DOCUMENTS

| | | |
|---|---|---|
| GB | 1248184 | 9/1971 |
| WO | 01/92590 A | 12/2001 |
| WO | 03/029502 A2 | 4/2003 |
| WO | 2004/024965 A | 3/2004 |

OTHER PUBLICATIONS

Flandorfer et al.; Experimental investigation and thermodynamic calculation of the tertiary system Mn-Y-Zr; Chemical Abstracts Service, CAPLUS; abstract only, AN 1997:528231.

Flandorfer et al.; Experimental investigation and thermodynamic calculation of the tertiary system Mn-Y-Zr; Z. Metallkd. 88(7): 529-538 (1997).

* cited by examiner

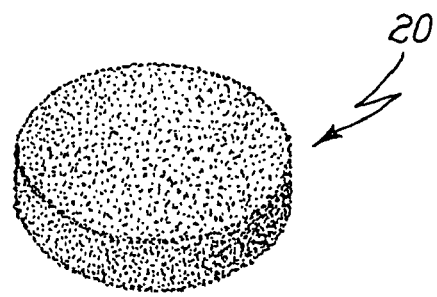
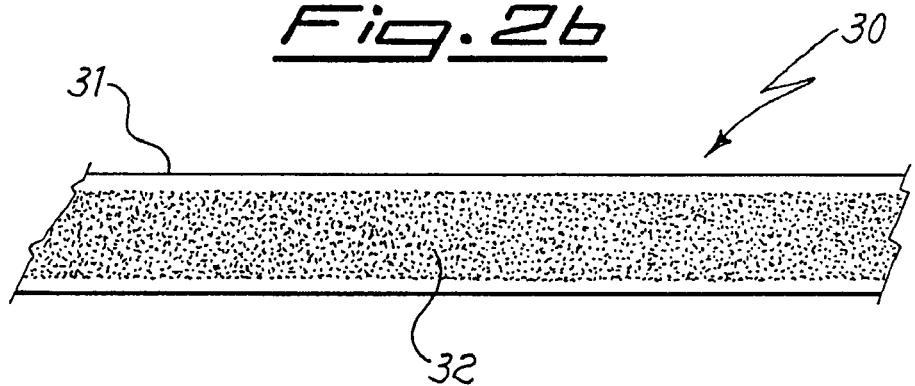
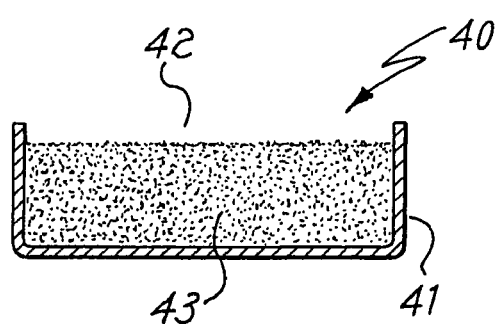
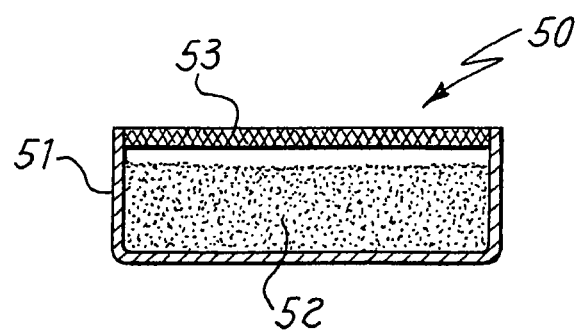

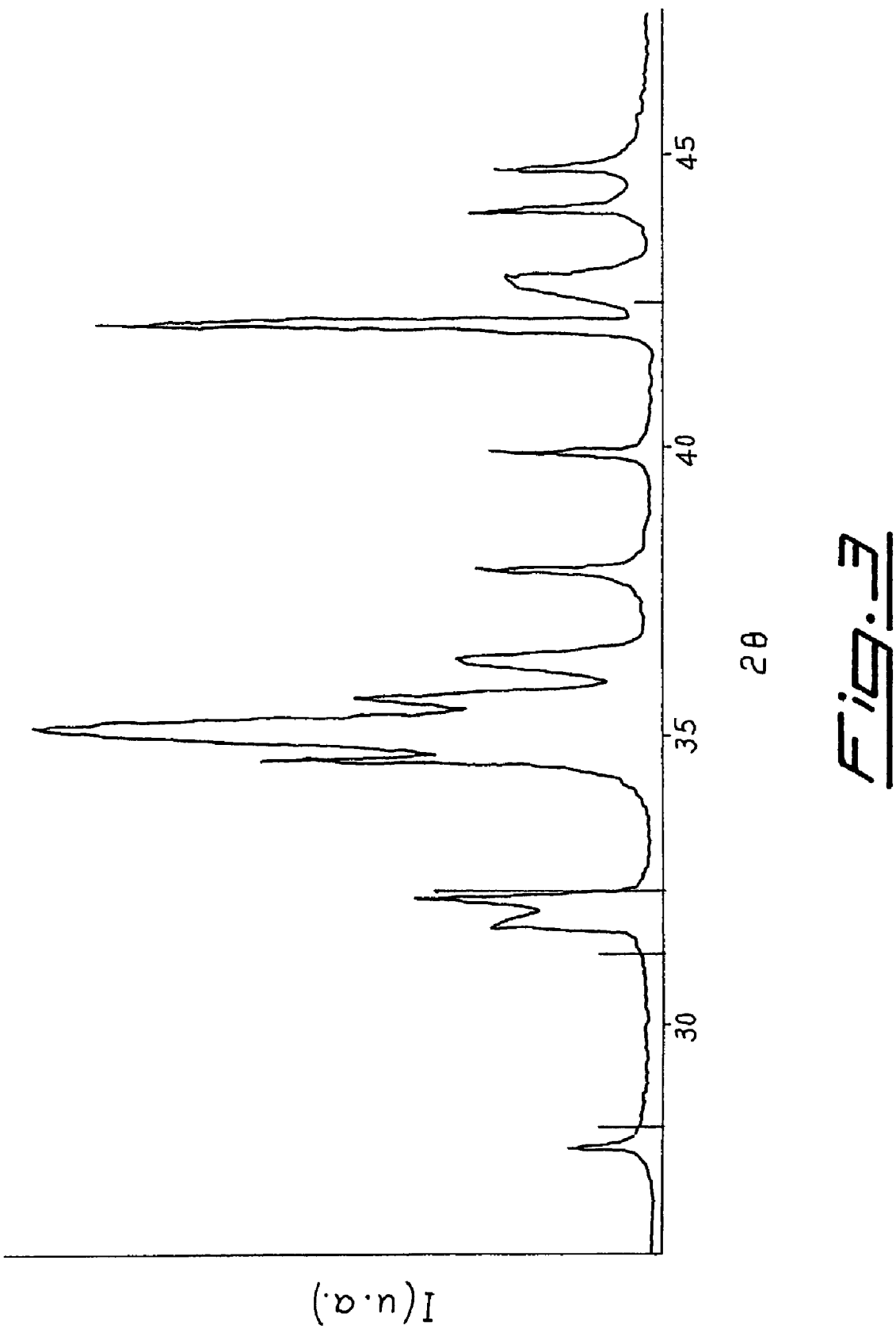

NON-EVAPORABLE GETTER ALLOYS FOR HYDROGEN SORPTION

CROSS-REFERENCE TO RELATED APPLICATIONS

This application is a Section 371 of International Application No. PCT/IT2005/000673, filed Nov. 18, 2005, which was published in the English language on Jun. 1, 2006, under International Publication No. WO 2006/057020 A1, the disclosure of which is incorporated herein by reference.

BACKGROUND OF THE INVENTION

The present invention is directed to non-evaporable getter alloys for the sorption of hydrogen. In particular the invention deals with non-evaporable getter alloys having good properties of hydrogen sorption at relatively low temperatures.

Many applications in the field of industry or research require for their correct working a hydrogen-free environment in a closed container; the space inside the container may be either kept under high vacuum conditions or filled with an atmosphere of a given gas (or gas mixtures). Examples of industrial applications in which hydrogen is detrimental are evacuated jackets for thermal insulation (e.g. in thermal bottles, also known as "thermos", or solar collectors), owing to the high thermal conductivity of this gas; some types of lamps, in which the presence of hydrogen in the filling gas generally results in the variation of the operating physical parameters (such as the lighting voltage); or X-ray generating tubes. The processes for manufacturing these devices comprise a step of container evacuation and possible filling thereof with the desired gas, but whenever a high vacuum or a hydrogen-free gas is produced, mechanisms exist which cause hydrogen to re-enter the system; these mechanisms are mainly the degassing of the container walls and the hydrogen permeation across these walls from the external atmosphere toward the container, thus leading to problems in the correct operation of said devices. Owing to the same mechanisms, hydrogen also represents the main contribution to the residual pressure in ultra-high vacuum (UHV) systems, such as the particle accelerators employed in the research field.

To remove these hydrogen traces it is known to employ non-evaporable getter materials (known in the field as NEGs), i.e. materials being capable of chemically fixing molecules of hydrogen as well as of other gases such as water, oxygen and carbon oxides. The getter materials are generally metals of the III, IV and V transition groups of the Periodic Table or alloys thereof with titanium-based and, particularly, zirconium-based alloys. These materials and their use for sorbing gases from evacuated spaces or from inert gases are well known and described in a number of patents, such as U.S. Pat. No. 3,203,901 (zirconium-aluminum alloys), U.S. Pat. No. 4,071,335 (zirconium-nickel alloys), U.S. Pat. No. 4,306,887 (zirconium-iron alloys), U.S. Pat. No. 4,312,669 (zirconium-vanadium-iron alloys), U.S. Pat. No. 4,668,424 (zirconium-nickel-Rare Earth alloys with the optional addition of one or more other metals), U.S. Pat. No. 4,839,085 (zirconium-vanadium-E alloys, wherein E is an element selected among Fe, Ni, Mn and Al), and U.S. Pat. No. 5,961,750 (zirconium-cobalt-Rare Earths alloys).

In particular, as far as hydrogen sorption is concerned, the use of yttrium or solid mixtures containing the same is also known. U.S. Pat. No. 3,953,755 discloses the use of this element (protected by thin layers of other metals) at the inside of discharge lamps. British Patent Specification GB 1,248,184 discloses the use of solid mixtures or intermetallic compounds of yttrium with other metals for sorbing hydrogen in various applications. This patent requires that yttrium is anyhow present in form of a separate phase in a sufficient quantity to accomplish the gettering function, so that the getter properties of the compositions according to that patent are essentially the same as those of pure yttrium. This characteristic can also be ascribed to the fact that with many of the metals listed in the patent (zirconium, titanium, niobium, hafnium, molybdenum, tantalum, tungsten and vanadium) yttrium does not form compounds nor alloys, whereas with other metals (aluminum, beryllium, cobalt, copper, iron, magnesium, nickel, manganese and zinc) yttrium only forms intermetallic compounds but not alloys (see the book "Constitution of Binary Alloys", First Supplement, edited by R. P. Elliot, McGraw-Hill, (1965)). The yttrium quantities there indicated are, however, such that in the composition this element is ensured to be in excess with respect to the quantity that could be bound in form of intermetallic compounds, whereby at least a portion thereof remains in a form of pure metal.

Finally, International patent application WO 03/029502 discloses yttrium-vanadium and yttrium-tin compositions being rich in yttrium; also in this case the hydrogen sorption properties of the material are essentially those of pure yttrium. The function of the metals added to yttrium in these two last documents is mainly that of enhancing the hydrogen sorption by the getter.

NEG materials show a sorption behavior with respect to hydrogen different from that towards other gases. While for most gases the chemical sorption by these alloys is irreversible, the sorption of hydrogen by NEGs is an equilibrium process reversible as a function of the temperature: hydrogen is efficiently sorbed at relatively low temperatures (under 200-400° C., according to the chemical composition of the material), but it is released at higher temperatures. The equilibrium features of these materials in sorbing hydrogen are generally represented graphically by means of curves giving, at different temperatures, the equilibrium pressure of hydrogen over the alloy as a function of the hydrogen concentration in the NEG material.

Another feature of the NEGs is that, in order to accomplish their function, they generally require a treatment of initial thermal activation at temperatures that can vary between about 300° C. and up to about 900° C. during a time comprised between few minutes up to several hours depending on the material composition.

Advantageous features for a NEG material to be employed for hydrogen sorption are a low hydrogen equilibrium pressure and a low activation temperature.

Among the previously cited NEG materials those with the best features of hydrogen sorption (low equilibrium pressures) are the zirconium-aluminum alloys, the zirconium-cobalt-Rare Earths alloys and yttrium. Among these materials the zirconium-aluminum alloys have a high activation temperature. In order to carry out a good activation of these alloys in a not excessively long time it is necessary to activate them at temperatures higher than 700° C. This feature makes them not suitable for any application, such as when the chamber to be kept free from hydrogen has glass walls, e.g., thermos or some lamps. Yttrium and compositions of British Patent GB 1,248,184 (which, as seen before, are functionally the same as pure yttrium) only work well if kept at relatively high temperatures of more than about 600° C. The zirconium-cobalt-Rare Earths alloys require lower temperatures of activation and operation, but have worse properties of hydrogen sorption (particularly the equilibrium pressure) than those of yttrium.

BRIEF SUMMARY OF THE INVENTION

An object of the present invention is to provide non-evaporable getter alloys for hydrogen sorption. In particular, an object of the present invention is to provide getter alloys showing a combination of features of hydrogen equilibrium pressure and of activation temperature, which is improved with respect to known NEG materials.

According to the present invention this object is achieved with non-evaporable getter alloys comprising, by weight, from 50% to 80% zirconium, from 1% to 20% yttrium and from 5% to 45% of one or more elements chosen among aluminum, iron, chromium, manganese and vanadium.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 2a-2d are schematic illustrations of some possible embodiments of non-evaporable getter devices made by using the alloys of the invention;

FIGS. 3 and 4 are X-ray spectra of two preferred alloys of the invention;

DETAILED DESCRIPTION OF THE INVENTION

Figure 1:
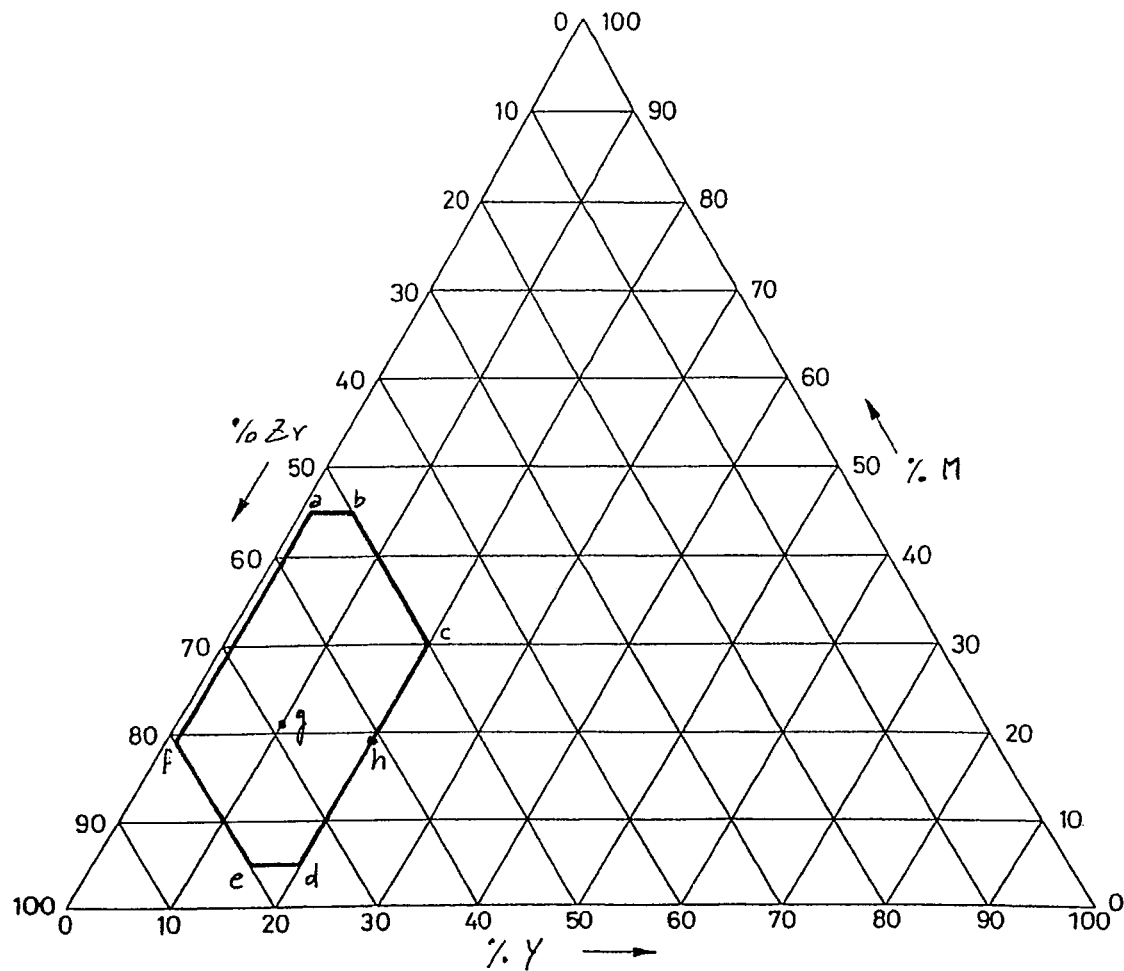
FIG. 1 is a ternary diagram in which the range of possible compositions of the NEG alloys according to the invention is represented.

The alloys useful for carrying out the invention are those that, when plotted on the ternary diagram of weight percentage compositions of FIG. 1, fall within the polygon defined by points:

a) Zr 54%-Y 1%-M 45%
b) Zr 50%-Y 5%-M 45%
c) Zr 50%-Y 20%-M 30%
d) Zr 75%-Y 20%-M 5%
e) Zr 80%-Y 15%-M 5%
f) Zr 80%-Y 1%-M 19% wherein M is an element selected among aluminum, iron, chromium, manganese, vanadium or mixtures of these elements.

One first preferred alloy of the invention is that of weight percent composition Zr 69%-Y 10%-Fe 21%, represented by point g in FIG. 1; a second preferred alloy of the invention is that having a weight percent composition Zr 61%-Y 20%-Fe 19%, represented by point h in FIG. 1.

The alloys of the invention can be prepared by melting in a furnace, from pieces or powders of the component metals, taken in the mutual ratios corresponding to the desired final composition. Preferred are the techniques of arc melting under inert gas, e.g., with a pressure of $3 \times 10^4$ Pascal (Pa) of argon; or in an induction furnace, under vacuum or inert gas. It is, however, possible to adopt other techniques which are common in the metallurgical field for preparing alloys. Melting requires temperatures higher than about 1000° C.

Different from compositions of British Patent Specification GB 1,248,184 and application International Application Publication WO 03/029502 previously described, wherein yttrium is present as a separate phase, mixed only mechanically with the other components, the materials of the invention are actually true alloys as shown by the X-ray diffraction spectra of FIGS. 3 and 4, discussed in the following with reference to the Examples.

For the production of getter devices using the alloys of the invention, be these in form of pellets of the getter material alone or made with the latter either on a support or in a container, it is preferred to use the alloys in powder form, with particle sizes generally lower than 250 micrometers (μm) and preferably comprised between 40 and 125 μm. Greater particle sizes result in an excessive reduction of the specific surface (surface area per weight unit) of the material, with consequent reduction of the gas sorption properties, in particular at temperatures of less than about 200° C. Although their use is possible and required in some applications, particle sizes of less than 40 μm give rise to problems in the manufacturing steps of the getter devices.

The shapes in which the getter devices can be prepared by using the alloys of the invention are the most various, comprising pellets formed of the getter alloys powders either alone or on a metallic support. In both cases the powders can be compacted either by compression or sintering. The pellets of compressed powders only may be applied for example in the thermal insulation of thermos. When the powders are supported, steel, nickel or nickel-based alloys are generally used as supporting material. The support can merely be in form of a strip on the surface of which the alloy powders are caused to adhere by either cold rolling or sintering after deposition by means of various techniques; getter devices obtained from such strips are used in lamps. The support can also be formed as an actual container, having the most various shapes, in which the powders are generally introduced by compression or even without compression in some devices having the container provided with a porous septum, permeable to the gas flow but capable of retaining powders. Some of these possibilities are illustrated in the FIGS. 2a-2d: FIG. 2a shows a pellet 20 made of compressed powders only of NEG alloy; FIG. 2b shows a NEG device 30 formed of a metallic strip 31 on which powders 32 of NEG alloy are present; FIG. 2c shows in cross-section a NEG device 40 formed of a metallic container 41 with an upper opening 42 having at the inside thereof powders of NEG alloy 43; and FIG. 2d shows in cross-section a NEG device 50 consisting in a metallic container 51 having inside powders of NEG alloy 52 with an upper opening closed by a porous septum 53.

The NEG alloys of the invention can be activated by means of treatments of either a few minutes at 500° C. or at about 300° C. during one or two hours, which are softer conditions than those typically required by the zirconium-aluminum alloys (temperatures of about 800-900° C.). Furthermore, they show good properties of hydrogen sorption at temperatures lower than those required by using yttrium or compositions of the prior art containing this element.

The invention will be further illustrated by the following examples. These non-limiting examples describe some embodiments intended to teach those skilled in the art how to put into practice the invention and to represent the best considered mode for carrying out the invention.

Example 1

This example describes the preparation of several alloys of the invention.

A series of alloys is produced starting from the component elements in powder form, weighing the powders in the desired ratio as given in the following table, that reports the weights in grams for each element and the nature of element M for the different samples:

TABLE 1

| Sample no. | Metal M | Zr (grams) | M (grams) | Y (grams) |
|---|---|---|---|---|
| 1 | Fe | 69 | 21 | 10 |
| 2 | Fe | 61 | 19 | 20 |
| 3 | Fe | 65 | 20 | 15 |
| 4 | Fe | 64 | 26 | 10 |
| 5 | Fe | 74 | 16 | 10 |
| 6 | Mn | 70 | 20 | 10 |
| 7 | Cr | 77.5 | 12.5 | 10 |
| 8 | Al | 75.5 | 14.5 | 10 |
| 9 | V | 63 | 27 | 10 |

The powders are mixed and poured into a water-cooled copper crucible of an arc furnace under an atmosphere of $3 \times 10^4$ Pa of argon (so-called "cold-earth" technique). The temperature reached by the mixture during melting is of about 2000° C., temperature that is maintained during about 5 minutes. Since the preparations take place under conditions of a high thermal gradient, in order to enhance the alloy homogeneity any ingot melting is repeated four times. The ingots obtained by cooling after the fourth melting are milled and the resulting powder is finally sieved, retrieving the fraction with particle size comprised between 40 and 105 μm.

The compositions of samples no. 1 and no. 2 correspond to points g and h, respectively, in the ternary diagram of FIG. 1. Portions of powders of these two samples are used to obtain the X-ray diffractometry spectra illustrated in FIGS. 3 and 4 for samples 1 and 2, respectively.

The remainder of powders of samples 1 and 2, and the powders of the other samples, are used to prepare several pellets for each sample, which are used in the subsequent tests: the pellets are obtained compressing 120 mg of powders of each sample under a pressure of 2000 kg/cm².

Example 2

Comparative

This example is directed to the preparation of a sample of an alloy made of zirconium, cobalt and misch-metal (misch-metal is a commercial mixture of lanthanum and Rare Earth metals). The features and preparation of this alloy are described in U.S. Pat. No. 5,961,750.

80.8 g of zirconium, 14.2 g of cobalt and 5.0 g of mischmetal having an approximate weight percent composition 50% cerium, 30% lanthanum, 15% neodymium and the remainder 5% of other Rare Earths are weighed. The procedure of Example 1 is repeated preparing also in this case a set of identical pellets. This sample will be referred to as sample 10 in the following.

Example 3

Comparative

This example is directed to the preparation of a mixture having the same overall weight percent composition of sample 1 of Example 1, but formed of powders of an alloy of zirconium and iron only with yttrium powders.

The zirconium-iron alloy is obtained as in Example 1, starting from 69 g of zirconium and 21 g of iron, both in powder, melting the powders, allowing them to solidify, milling the ingot thus obtained, and retrieving the fraction of particle size comprised between 40 and 105 μm by sieving. Then, 10 g of powdered yttrium having the same particle size are added to the powders thus obtained; with this mixture of powders a set of identical pellets are prepared as described in Example 1. This sample will be referred to as sample 11 in the following.

Example 4

A hydrogen sorption test is carried out on a pellet of each of samples 1, 2, 10 and 11. All the pellets are activated at 500° C. for 10 minutes. The sorption tests are carried out according to the procedure described in the ASTM F 798-82 standard with a test temperature of 400° C. and a hydrogen pressure of $4 \times 10^{-3}$ Pa. These tests are said to take place under "dynamic conditions," because the test chamber is fed with a variable flow of hydrogen, regulated by a feed-back system, in order to have a constant pressure of hydrogen over the pellet under test. The results of these tests are graphically represented in FIG. 5 as sorption speed, S, measured in cubic centimeters of sorbed hydrogen per second and per gram of alloy (cc/s×g), as a function of the quantity of sorbed hydrogen, Q, measured in cubic centimeters of gas multiplied by the sorption pressure (in Pascal) and normalized per gram of alloy (cc×Pa/g); the numbering of curves corresponds to the numbering of samples (thick lines are used for the samples of the invention, thin lines for comparative samples 10 and 11).

Example 5

The hydrogen equilibrium pressure of another pellet of sample 1 prepared as described in Example 1, is measured.

The measurement system is formed as a glass bulb, connected to a pumping apparatus through a liquid nitrogen trap which helps to keep a low background pressure during the test; the sample is heated from the outside of the bulb by radio-frequencies by means of an induction coil. The system is evacuated until a residual pressure of $1 \times 10^{-4}$ Pa is reached. Under pumping the sample is activated by heating with radio-frequency at 700° C. for an hour. At the end of activation process the sample is brought to the temperature of 600° C. and the bulb is isolated from the pumping apparatus. A measured quantity of hydrogen is introduced into the bulb and the pressure variations are measured by a capacitance manometer; the pressure value at which the system stabilizes provides the equilibrium pressure under those conditions. Such a procedure is repeated several times while each time a different quantity of hydrogen is introduced into the system. From the measurement of the equilibrium pressures, being known the system volume and the alloy weight, the concentration of hydrogen sorbed by the alloy under the different measurement conditions is obtained. The values of equilibrium pressure, P, measured in hectopascal (hPa), are graphically represented in FIG. 6 (curve 1) as a function of the sorbed hydrogen concentration, C, measured in cubic centimeters of gas multiplied by the sorption pressure and normalized per gram of alloy (cc×hPa/g).

Figure 6:
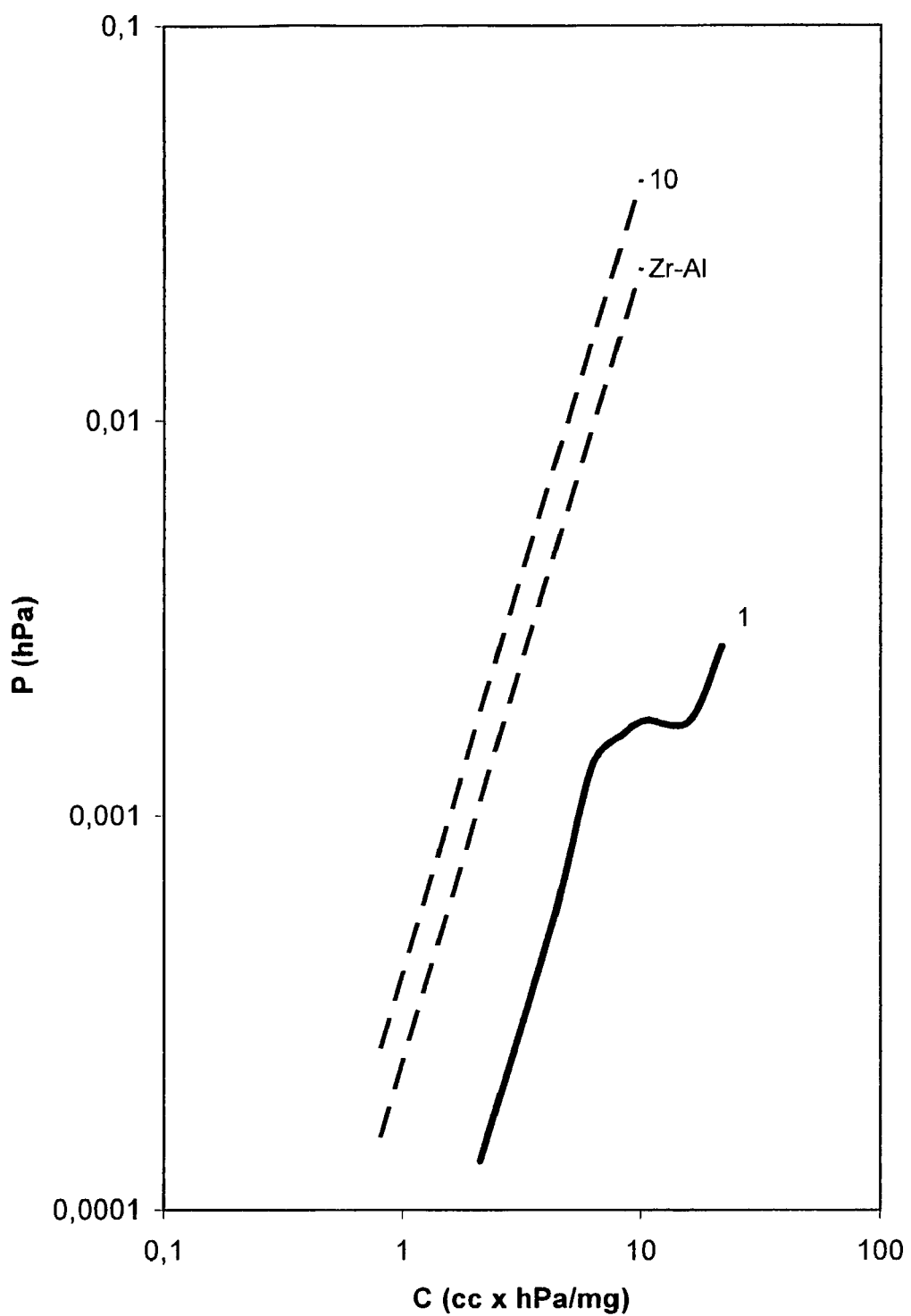

For comparison, in the graph of FIG. 6, there are also shown two curves relating to the hydrogen equilibrium pressure of two materials considered in the field particularly suitable for the sorption of hydrogen, namely, a zirconium-cobalt-mischmetal alloy of composition corresponding to that of sample 10 (curve 10) and a zirconium-aluminum alloy of U.S. Pat. No. 3,203,901 (curve labeled Zr—Al). Curves 10 and Zr—Al are portions of lines obtained by averaging the data resulting from a number of experimental tests carried out in the past with said known alloys in the same conditions as described above for sample 1.

Example 6

A series of hydrogen sorption tests is carried out on all samples 1 and 3 through 11. This series of tests is carried out under so called "static conditions," because hydrogen is fed into the measuring chamber in subsequent dosings, insulating the chamber between two successive dosings, rather than continuously; the measuring system and procedure are described in detail in the paper "The properties of some zirconium-based gettering alloys for hydrogen isotope storage and purification", C. Boffito et al., *Journal of Less-Common Metals,* 104:149 (1984).

The tests are performed in the following conditions:
initial hydrogen pressure at each dosing=$1 \times 10^{-1}$ hPa;
getter temperature=400° C.;
no getter activation.

Figure 7:
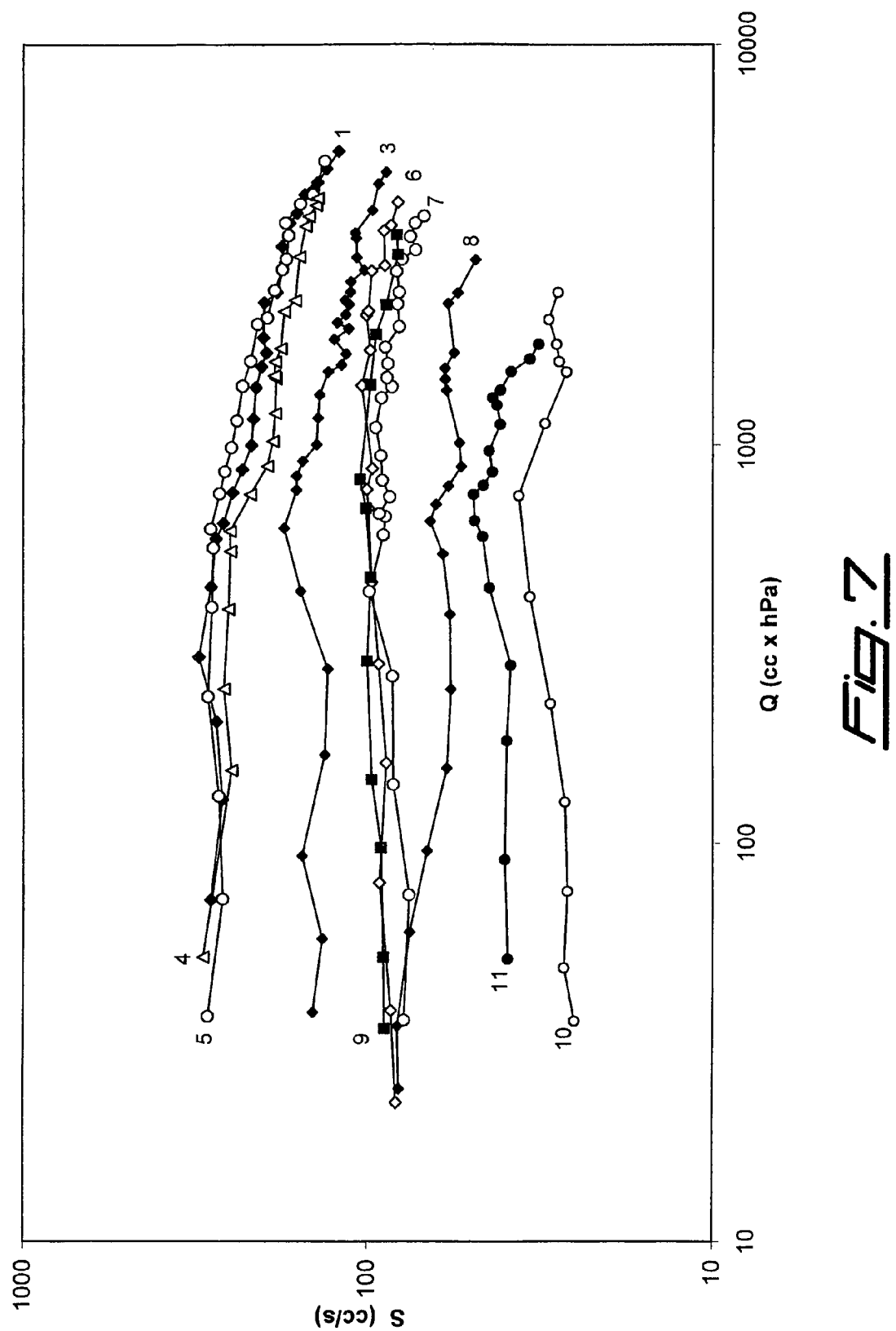

The output of these tests are the curves shown in FIG. 7, giving for each sample the speed of hydrogen pumping, S (expressed in cc/s), as a function of the quantity of hydrogen sorbed, Q (expressed in cc×hPa); the numbering of curves corresponds to the numbering of samples.

The results of experimental tests described above are discussed below.

Figure 4:
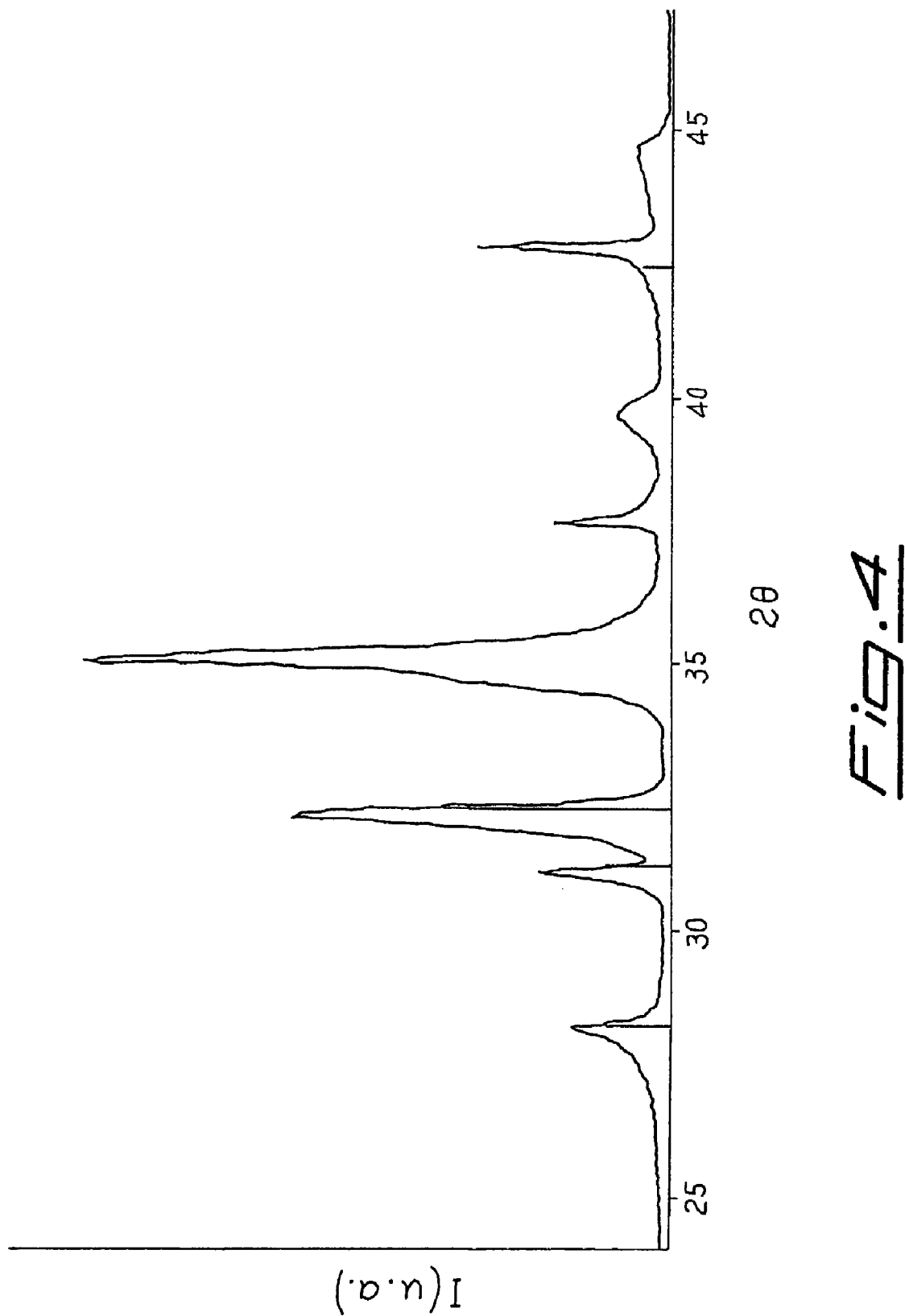

The diffractograms shown in FIGS. 3 and 4 refer to Zr—Y—Fe alloys containing 10% and 20% by weight of yttrium, respectively. The diffractograms show the intensity of the peaks (I, in arbitrary units, a.u.) as a function of reflection angle (2θ). The vertical lines shown in the spectra, at 2θ angles of about 28.3°, 31.2°, 32.3° and 42.6°, respectively, represent the positions and relative intensities of the peaks of pure yttrium. The main peaks in both diffractograms are not coincident with those of yttrium; furthermore, in case of the alloy containing 10% by weight of yttrium, essentially there are no peaks in the positions corresponding to those of pure yttrium, thus confirming that in this case yttrium is present completely alloyed with zirconium and iron, whereas in the case of composition with 20% of yttrium, "shoulders" that can be attributed to yttrium are observed in connection to main peaks.

Figure 5:
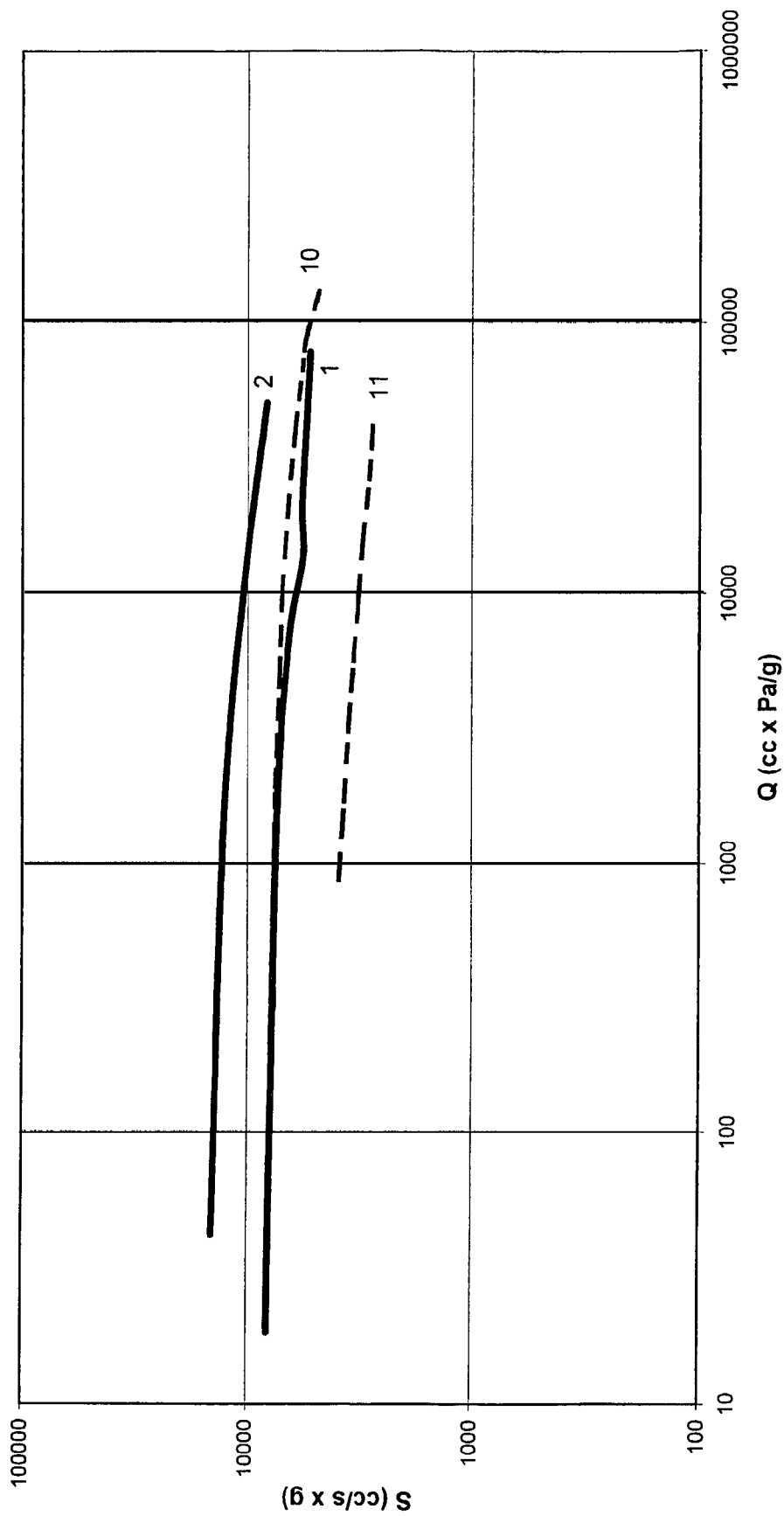
FIGS. 5, 6 and 7 are graphs showing the hydrogen sorption features of some alloys of the invention and of some comparison alloys.

The graph of FIG. 5 confirms that the alloys of the invention have hydrogen sorption properties at least equal to those of a zirconium-cobalt-mischmetal alloy of the prior art, which is considered particularly suitable for sorbing this gas. Furthermore, the alloys of the invention are clearly superior in sorbing hydrogen with respect to the mixture between a Zr—Fe alloy and pure yttrium of the example 3 (curve 11), and this too confirms that yttrium forms an actual, true alloy in the compositions of the invention (particularly meaningful is the comparison of hydrogen sorption properties of samples 1 and 11, being the compositions of these two samples nominally identical).

The graph of FIG. 7 give similar results: all the compositions of the invention (curves 1 and 3 through 9) show properties of hydrogen sorption that are better than those of an alloy of Example 2 (curve 10), widely used in the field for hydrogen sorption, as well as of the mixture of Example 3 (curve 11).

Finally, curve 1 in FIG. 6 shows the variation trend of the hydrogen equilibrium pressure of a pellet of sample 1, compared to similar graphs for known alloys widely used in the field for hydrogen sorption. Again, this graph shows that an alloy of the invention, at the same activation temperature (700° C.) and test temperature (600° C.) shows a hydrogen equilibrium pressure which is neatly lower, by about one order of magnitude, with respect to the comparison alloys.

The alloys of the invention have hydrogen equilibrium pressure values, as well as activation and operation temperatures, lower than those of known alloys; at the same time, the alloys of the invention have lower activation and operation temperatures than yttrium; this could be due to the fact that, differently from the prior art materials, in this case yttrium forms actually true alloys with the other elements being present.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for sorption of hydrogen, comprising contacting the hydrogen with a non-evaporable getter alloy having a composition, expressed in weight percent, of 50-80% Zr, 10-20% Y, and a remainder M 5-40%, wherein M is selected from the group consisting of Al, Fe, Cr, Mn, V and mixtures thereof, and when represented in a ternary diagram of weight percent, the composition falls within a polygon defined by the following points:
   a) Zr 50%-Y 10%-M 40%
   b) Zr 50%-Y 20%-M 30%
   c) Zr 75%-Y 20%-M 5%
   d) Zr 80%-Y 15%-M 5%
   e) Zr 80%-Y 10%-M 10%,
   wherein the alloy is present in a getter device and the getter alloy has a form of a powder, and wherein the getter device comprises pellets consisting essentially of compressed powders of the getter alloy.

2. The method according to claim 1, wherein M is iron.

3. The method according to claim 2, wherein the getter alloy has a weight composition of Zr 69%-Y 10%-Fe 21%.

4. The method according to claim 2, wherein the getter alloy has a weight composition of Zr 61%-Y 20%-Fe 19%.

5. The method according to claim 2, wherein the getter alloy has a weight composition of Zr 65%-Y 15%-Fe 20%.

6. The method according to claim 1, wherein the powder has a particle size of less than 250 μm.

7. The method according to claim 6, wherein the powder has a particle size comprised between 40 and 125 μm.

8. A method for sorption of hydrogen, comprising contacting the hydrogen with a non-evaporable getter alloy having a composition, expressed in weight percent, of 50-80% Zr, 10-20% Y, and a remainder M 5-40%, wherein M is selected from the group consisting of Al, Fe, Cr, Mn, V and mixtures thereof, and when represented in a ternary diagram of weight percent, the composition falls within a polygon defined by the following points:
   a) Zr 50%-Y 10%-M 40%
   b) Zr 50%-Y 20%-M 30%
   c) Zr 75%-Y 20%-M 5%
   d) Zr 80%-Y 15%-M 5%
   e) Zr 80%-Y 10%-M 10%, wherein the alloy is present in a getter device and the getter alloy has a form of a powder, wherein the device comprises a metallic strip, wherein the metallic strip consists essentially of powders of the getter alloy supported thereon, wherein the powers are caused to adhere to the strip by cold rolling or deposition followed by sintering.

9. The method according to claim 8, wherein the device comprises a container having an upper opening inside which are powders of the getter alloy.

10. The method according to claim 8, wherein the device comprises a container inside which are powders of the getter alloy, the container having an upper opening closed by a porous septum.

11. The method according to claim 8, wherein the powder has a particle size of less than 250 µm.

12. The method according to claim 11, wherein the powder has a particle size comprised between 40 and 125 µm.

* * * * *